July 10, 1928.  G. M. BARTLETT  1,676,242
FLEXIBLE SHAFT COUPLING
Filed Aug. 25, 1925

INVENTOR
George M. Bartlett

Patented July 10, 1928.

1,676,242

UNITED STATES PATENT OFFICE.

GEORGE M. BARTLETT, OF INDIANAPOLIS, INDIANA.

FLEXIBLE SHAFT COUPLING.

Application filed August 25, 1925. Serial No. 52,439.

This invention relates to couplings for connecting two shaft ends in such a way as to allow power to be transmitted between the two ends when the respective axes of the two shafts are not precisely in the same straight line.

The object of my invention is to provide a flexible coupling that will produce the least possible side stresses on the bearings in which the connecting shafts turn.

Another object is to make provision for longitudinal motion of either shaft.

A further object is to provide a coupling in which the driving force will be equally divided between points on opposite sides of the shaft axes.

Figure 1:
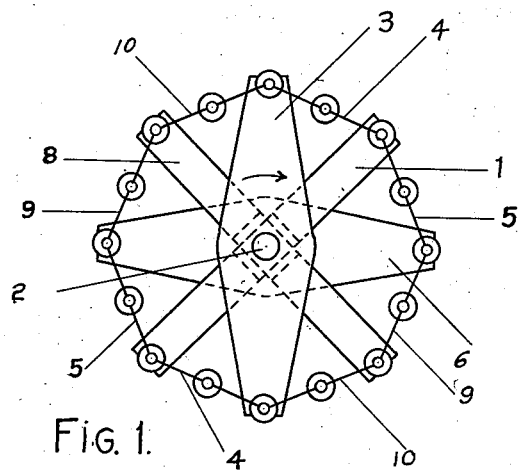
Figures 2, 3:
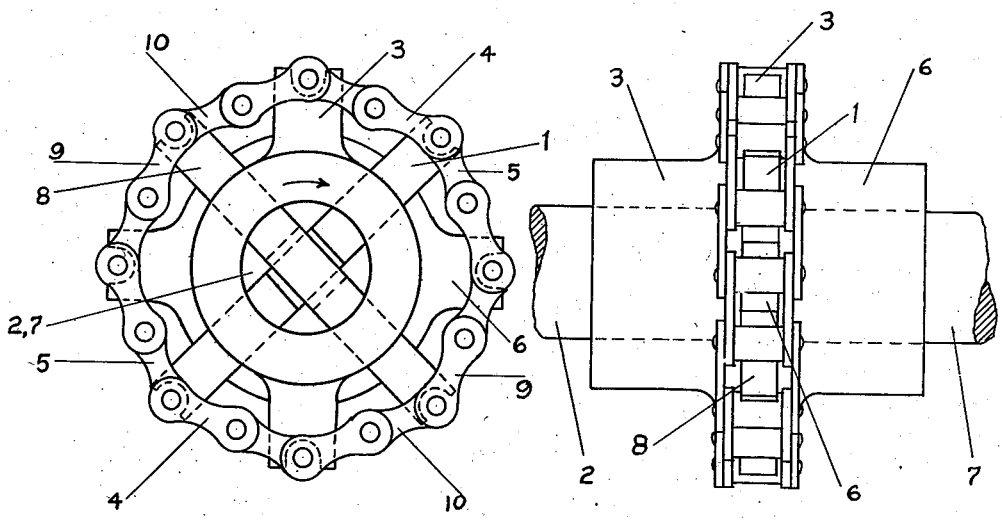

In the accompanying drawings, Figure 1 is an end view of a coupling and illustrating in simple form the link-work which represents the basic principle on which my coupling is constructed. Figure 2 is an end view of a practical modification of Figure 1. Figure 3 is a side view of Figure 2.

The same numerals apply to similar parts in each of the figures.

Referring to Fig. 1 the driving shaft 2 is perpendicular to the plane of the drawing. The transverse piece 3 is secured to the shaft end and has notches at its ends to receive certain chain parts; in this case the rollers of a roller chain. The transverse piece 6 is similar to 3 but arranged at right angles to it, and is secured to the end of the driven shaft 7 not shown in this figure. The floating cross bars 1 and 8 are located between the members 3 and 6 but not sensibly in contact with them nor with one another. They are notched at their ends like members 3 and 6. A chain 4—5—9—10 engages the notches of the transverse members 3 and 6 and of the cross bars 1 and 8.

If the axes of the two shafts 7 and 2 lie in the same straight line and shaft 2 is rotated in the direction shown, the chain sections 10—9 will be in tension and will drive the transverse piece 6 from both ends causing the shaft 7 to rotate. The cross bars 1 and 8 will not alter their relative positions. If the driving shaft turns in the opposite direction the chain sections 4—5 will then be in tension.

If however the axes of the two shafts should not be coincident, the cross bars 1 and 8 then act as compensators keeping the chain from becoming either too tight or too loose by means of their free floating action. Relative motions will be set up between the parts 1, 4, 5, 8, 9 and 10 which allows the driving forces to be equally divided between the two ends of member 3 and also the two ends of member 6. This relieves the shaft bearings of practically all side stresses and insures the transmission of rotary motion to the driven shaft at a uniform angular velocity ratio.

A longitudinal shaft motion is provided for by making the thickness of members 3 and 6 somewhat less than the width of the chain. This provision also permits an angular misalignment between the shafts.

Figure 2 shows an end view, and Figure 3 a side view of one form of this coupling designed for use with a roller chain.

I claim as my invention:

1. In a flexible shaft coupling, the combination of two shaft ends in general alinement, two intermediate members, two pairs of chain sections connecting one shaft end to the two intermediate members respectively, and two pairs of chain sections connecting the other shaft end to the two intermediate members respectively; the two chain sections of each pair being on opposite sides of the general axis of the coupling and extending circumferentially in the same direction from the intermediate member, the chain sections of one pair associated with each shaft end extending in the opposite circumferential direction from the chain sections of the other pair connected with that shaft end, so that one pair of the chain sections for each shaft end is always in tension regardless of the direction of torque between the two shaft ends; and the line joining the middle points of the chain sections of one pair connected to an intermediate member being circumferentially displaced from the line joining the middle points of the links of the other pair connected to that intermediate member, no two consecutive chain sections being in alinement, and the ends of the chain sections being flexibly connected with the shaft ends in such a manner as to permit motion in the direction of the shaft axis.

2. In a flexible shaft coupling, the combination of two shaft ends in general alinement, two intermediate members, two pairs of chains connecting one shaft end to the two intermediate members respectively, and two pairs of chains connecting the other shaft end to the two intermediate members respectively; the two chains of each pair being on opposite sides of the general axis of the coupling, the links of one pair associated with each shaft end extending in the opposite circumferential direction from the links of the other pair connected with that shaft end, so that one pair of the chains for each shaft end is always in tension regardless of the direction of torque between the two shaft ends; and the line joining the middle points of the chains of one pair connected to an intermediate member being circumferentially displaced from the line joining the middle points of the chains of the other pair connected to that intermediate member, no two consecutive chains being in alinement, and the chains being flexibly connected with the shaft ends in such a manner as to permit motion parallel to the shaft axis.

In witness whereof, I have hereunto set my hand at Indianapolis, Indiana, this 7th day of August, A. D. one thousand nine hundred and twenty-five.

GEORGE M. BARTLETT.